United States Patent
MacKenzie et al.

(10) Patent No.: US 10,523,772 B2
(45) Date of Patent: *Dec. 31, 2019

(54) CROSS CHANNEL IN-VEHICLE VIDEO CONSUMPTION MEASUREMENT AND ANALYSIS

(71) Applicant: Drive Time Metrics, Inc., Jamestown, RI (US)

(72) Inventors: Roderick MacKenzie, Ft. Lauderdale, FL (US); Robert J. Maccini, Cumberland, RI (US); Joseph V. Gallagher, Newport, RI (US)

(73) Assignee: Drive Time Metrics, Inc., Jamestown, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/261,691

(22) Filed: Jan. 30, 2019

(65) Prior Publication Data

US 2019/0158614 A1 May 23, 2019

Related U.S. Application Data

(63) Continuation-in-part of application No. 16/180,173, filed on Nov. 5, 2018, which is a continuation-in-part
(Continued)

(51) Int. Cl.
*H04L 29/08* (2006.01)

(52) U.S. Cl.
CPC .......... *H04L 67/22* (2013.01); *H04L 67/303* (2013.01)

(58) Field of Classification Search
CPC .... G06Q 30/0242; H04H 60/33; H04L 67/22; H04L 67/303; H04L 67/306; H04W 4/029; H04W 4/44
See application file for complete search history.

(56) References Cited

U.S. PATENT DOCUMENTS

| | | |
|---|---|---|
| 5,896,554 A | 4/1999 | Itoh et al. |
| 7,359,687 B2 | 4/2008 | Ceresoli et al. |
| (Continued) | | |

FOREIGN PATENT DOCUMENTS

| | | |
|---|---|---|
| CA | 2441373 A1 | 3/2005 |
| CN | 203119912 U | 8/2013 |

OTHER PUBLICATIONS

Media Rating Council accredited service providers—http://www.mediaratingcouncil.org/Accredited%20Services.htm.

*Primary Examiner* — Gil H. Lee

(74) *Attorney, Agent, or Firm* — Barlow, Josephs & Holmes, Ltd.

(57) ABSTRACT

The invention provides a novel and unique system and method for cross channel in-vehicle media consumption measurement and analysis. Real-time measurement and analysis of all applicable forms of media that a driver or passenger may consume inside of an automobile can be achieved. This includes stored media such as DVDs, streaming media, internet video (including OTT programming), broadcast television utilizing ATSC 3.0, satellite television, use of social media platforms and office productivity programs, online chat, use of hands-free calling and other forms of video communication, including content routed to the In Vehicle Entertainment (IVE) system through integration with a smartphone, media player or other similar external Consumer Electronic (CE) device via wired or wireless connectivity, including but not limited to USB, BLUETOOTH, Wi-Fi, and the like, and also including integration platforms such as HULU, VIMEO, YOUTUBE, COX, COMCAST, VERIZON, NETFLIX, HBO, AMAZON PRIME, FACEBOOK, INSTAGRAM, TWITTER, SNAPCHAT and the like.

20 Claims, 7 Drawing Sheets

Related U.S. Application Data of application No. 14/872,497, filed on Oct. 1, 2015, now Pat. No. 10,165,070.

(60) Provisional application No. 62/059,420, filed on Oct. 3, 2014.

(56) References Cited

U.S. PATENT DOCUMENTS

| | | |
|---|---|---|
| 7,486,925 B2 | 2/2009 | Breen |
| 7,584,484 B2 | 9/2009 | Headley et al. |
| 8,549,552 B2 | 10/2013 | Ramaswamy et al. |
| 8,666,303 B2 | 2/2014 | Ramaswamy et al. |
| 2003/0216120 A1 | 11/2003 | Ceresoli et al. |
| 2005/0221774 A1* | 10/2005 | Ceresoli ............... H04H 60/32 455/152.1 |
| 2005/0258942 A1* | 11/2005 | Manasseh ............. G07C 5/008 340/425.5 |
| 2006/0105702 A1 | 5/2006 | Muth et al. |
| 2006/0206582 A1 | 9/2006 | Finn |
| 2010/0131642 A1* | 5/2010 | Chalikouras ........... G06Q 30/02 709/224 |
| 2010/0257052 A1 | 10/2010 | Zito et al. |
| 2011/0010435 A1 | 1/2011 | Okaya et al. |
| 2011/0103595 A1* | 5/2011 | Ramaswamy ......... H04R 29/00 381/56 |
| 2012/0265617 A1 | 10/2012 | Reynolds |
| 2014/0073236 A1 | 3/2014 | Iyer |
| 2014/0160667 A1* | 6/2014 | Van Velzen ........... G06F 1/1632 361/679.41 |

\* cited by examiner

CROSS CHANNEL IN-VEHICLE VIDEO CONSUMPTION MEASUREMENT AND ANALYSIS

CROSS REFERENCE TO RELATED APPLICATION

This application is a continuation-in-part of and claims priority from earlier filed U.S. patent application Ser. No. 16/180,173, filed on Nov. 5, 2018, which is a continuation-in-part of earlier filed U.S. patent application Ser. No. 14/872,497, filed Oct. 1, 2015, now U.S. Pat. No. 10,165,070, which claims benefit to U.S. Provisional Patent Application Ser. No. 62/059,420, filed Oct. 3, 2014, the entire contents thereof are incorporated herein by reference.

BACKGROUND OF THE INVENTION

The invention relates generally to a system for real-time monitoring of the use of media content in a vehicle, via software installed in the head unit of a vehicle.

Research studies in the media industry typically, and consistently, indicate that more than 50% of radio listening is done in a vehicle, such as a car, and further that more than 50% of all audio listening occurs in such a vehicle. However, today there does not exist any ability to actually measure and effectively analyze what people are really listening to, or watching, while in a vehicle.

Measurement and analysis of people media consumption while in a vehicle is important to multiple stakeholders, such as: 1) radio (and other content) advertising businesses to support the buying/selling and pricing of advertising (the US market for radio advertising alone being valued at $17 billion in 2013); 2) radio station owners and programming managers to guide their selection of programming and on-air talent; 3) the music industry to gauge public reaction to artists and their work; 4) the automotive industry to understand the behavior of their customers while in their vehicles; 5) and any other entity that may be interested in the measurement and analysis of such media consumption.

There have been many attempts in the prior art to generate estimates of the use of in-vehicle audio content. For example, Nielsen Audio, previously Arbitron, provides a service to estimate the audience of AM/FM radio stations, which is primarily based on periodic survey methodologies using samples. These include use of log book/diaries, which are manually filled out by a limited sample of selected participants, and the use of specialized devices such as Nielsen's "Portable People Meter" or PPM. A PPM is a small device worn or carried by selected participants which identifies any AM/FM radio stations in earshot of the participant from identification signals embedded in each individual radio station broadcast. Other approaches have involved the use of expensive specialized measurement equipment added to a sample number of vehicles.

However, these existing prior art methods have many disadvantages and problems. As a result, these estimation methodologies are considered to be outdated and inadequate to meet the current needs of stakeholders because they, for example, suffer from: 1) small participant sample size; 2) high cost of gathering data in this manner; 3) potential for the statistical integrity of the approach to be compromised (whether unintentionally or fraudulently) by the participants; 4) infrequent periodic timing (only several times per year) with significant lag time between survey and report availability, thus not providing the potential for real-time monitoring and analysis desired by the industry; 5) lack of ability to comparatively measure "cross channel" audio consumption (e.g. AM/FM radio vs. SDARS vs. Internet Radio, etc.); lack of ability to measure all types of media consumption (e.g. audio, video, etc.)

Despite the foregoing limitations in the methodology used, Nielsen still generated more than $450M from the sale of AM/FM radio measurement data for the US market in 2013 as no viable alternative rating source data is available.

Nielsen utilizes panels of selected participants where they ask questions regarding audio usage and then extrapolates to the population. Nielsen also utilizes a PPM (portable people meter) which is a small metering device that is carried by a small group of people which listens to what audio is around them and can identify what stations are playing based on code that is, embedded in a station's broadcast, to measure FM and AM radio. This too is a sample.

As another prior art example, Triton Digital measures Internet radio listening utilizing server logs for each station/channel. Typically each individual channel has access to this information as well from their content delivery network.

In a further example, SiriusXM is not able to measure what channels its subscribers are listening to as it is primarily a one-way broadcast via satellites, In view of the above, there is currently no comprehensive source of data for the accurate measurement of the full spectrum of media content that is actually consumed in an automobile. The currently available estimates of in-vehicle audio listening are deficient in many ways, including: 1) Not real-time or near real-time (surveys conducted only several times per year with considerable lag time before reports are available); 2) Do not cover all potential media sources (e.g. can estimate AM/FM radio but can not estimate SDARS, internet radio, stored media, streaming media, etc.); 3) Unable to provide "cross-channel" comparison (e.g. between FM & SDARS); 4) Unable to measure content brought in to the vehicle via a connected MP3 player, DVD/Blu-ray player, smartphone or other Consumer Electronic (CE) device; 5) Survey-based methodology (rather than actual measurement); 6) Small survey participant sample size; 7) Significant vulnerability to bias and fraud; 8) High cost of data collection (both the high cost of administering the survey participants and the high cost of specialized monitoring equipment such as Nielsen's PPM device); 9) Provide minimal geographic location information.

The clear industry requirement, not met by any existing system, is for a comprehensive capability that measures all forms of media consumed in the vehicle including, but not limited to, terrestrial AM/FM, HD Radio, SDARS (SIRIUS XM), Internet radio and audio/video streaming services (e.g. PANDORA, TUNEIN, SPOTIFY, RDIO, SONGZA, YOUTUBE, etc.), personal media collection (CD, MP3, podcast, DVD, Blu-ray, etc.), audio books, podcasts, text-to-speech, use of hands-free calling and other audio, including content routed to the In Vehicle Entertainment (IVE) system through integration with a smartphone, MP3 player or similar external CE device (via wired or wireless connectivity, including but not limited to USB, BLUETOOTH, Wi-Fi, etc. and including various platforms for in-vehicle smartphone integration such as APPLE CARPLAY, GOOGLE ANDROID AUTO, HARMAN AHA RADIO, PANASONIC AUPEO, PIONEER ZYPR, FORD SYNC, MIRRORLINK, AIRBIQUITY CHOREO, etc.).

Another clear requirement, which is not met by any existing system is the need to facilitate low-cost, large-scale deployment to support measurement from a large user sample to ensure a high level of statistical integrity and accuracy. Existing approaches using a) survey-based methodologies or b) methodologies requiring specialized equipment that needs to be installed in a vehicle do not provide the potential to meet this objective in a viable and cost-effective manner.

The advent of autonomous vehicles will allow vehicle occupants time to consume more media content especially video content as there will no longer be a dedicated human driver of the vehicle. Heretofore almost all video (except for rear seat screens) has not been present in vehicles due to safety reasons. All occupants in an autonomous vehicle will be passengers who will now have time available for entertainment or work related activities during use of the vehicle.

Volume of autonomous vehicles will likely surpass 51,000 units in 2021 when personally owned autonomous cars reach individual buyers for the first time, and IHS Markit forecasts estimate nearly 1 million units will be sold in 2025 across shared fleets and individually owned cars.

Video signals may be delivered to the vehicle via direct broadcast by satellite, ATSC 3.0 (also known as Next Gen TV), the internet ("IP"), including 5G or successor technology, systems, and other technologies. Due to their mobility vehicles can only receive content delivered in real time via wireless technologies. One form of video delivered to a vehicle will utilize a new standard. The Advanced Television Systems Committee ("ATSC") also known as Next Gen TV has developed the standard, ATSC 3.0, which significantly improves the current version of free, over the air TV and will allow many interactive viewing and data services in the future. ATSC 3.0 tuners can be installed in vehicles. The roll out of television stations employing ATSC 3.0 technology has begun, e.g. the HbbTV standard in Europe.

The ATSC screen resolution is going to be 3,840×2,160, commonly known as 4K OR UHD. ATSC 3.0 employs an Internet Protocol (IP) based broadcast standard that will enable data services for the connected and autonomous vehicle in addition to immersive audio and video. In some instances a hybrid system may be utilized where the main content (audio and video) will be sent over the air, but other content (targeted ads, for example) will be sent over IP and integrated into the program.

One of the more innovative features of ATSC 3.0 is a "return data path" which is a way for the station tuned to in a vehicle to know you are watching. The instant invention can allow the collection and transmission of this data out of the vehicle for further review and analysis. The return data path can create the ability for marketers to target advertising. The return path described in the ATSC 3.0 specification, can inform, based on a common clock, that a content piece was rendered. For example, as discussed herein, the invention may be utilized to measure the impact of this targeted advertising, e.g. did the vehicle drive to the store after hearing or seeing the ad. The instant system and method can replace or enhance this return data path.

IP technology can be built into the car and may be utilized (via, e.g., an embedded cellular modem) or brought into the car via a mobile device and then connected to the in vehicle infotainment system for display on video monitors built into the vehicle. This video content can be from such providers as HULU, VIMEO, YOUTUBE, COX, COMCAST, VERIZON, NETFLIX, HBO, AMAZON PRIME and many others. Other content can be video games (electronic game that involves interaction with a user interface to generate visual feedback on a video screen) or other electronic applications that are either locally stored or are web-based applications including social media platforms such as TWITTER, FACEBOOK and LINKEDIN, chat programs such as SNAPCHAT, office productivity programs such as MICROSOFT EXCEL, POWERPOINT, WORD and the like. This type of video content will be distributed by such companies as NINTENDO, ELECTRONIC ARTS, SONY INTERACTIVE, ACTIVISION BLIZZARD, MICOSOFT, GOOGLE and the like.

In addition to IP technology and ATSC 3.0 or similar delivery methods, video can be delivered via satellite by such providers as DIRECTTV and DISH NETWORK as well as others. Direct broadcast satellite service providers transmit digital satellite television and audio to households in the U.S. Latin America, and the Caribbean. Video, audio, and software delivery technologies are already being employed in vehicles. However, with the advent of autonomous vehicles this delivery method can also be deployed in more vehicles for use by all of the vehicle occupants—not just passengers. Further IP systems may also deliver content of various types, and often work in conjunction with interactive communications, such as cell-based systems to select the content to be delivered.

Seventy-Six percent of US households are subscribed to cable, satellite or fiber for TV, while 21 percent relied on antenna reception for at least one TV in the home. However, the percentage of antenna users went up four points as compared to 2014, according to the Consumer Technology Association. Current model consumer vehicles may not include a receiver for ATSC 3.0 signals, but it is anticipated that this will be a common application available in autonomous vehicles where data, audio and video can be more easily consumed.

To meet industry expectation, there is a need for an optimum system to be able to continuously provide measurement data in real-time and with a high degree of geographic location accuracy. A large sample size, as identified above, is also a pre-requisite of achieving this requirement.

Still further, having developed a system and methodology to actually measure the media content, including audio and video, consumed in a vehicle, there is also a demand for a differentiation between multiple users of the vehicle (e.g. members of the same family). This includes contextual analysis of how media consumption may differ with situation (e.g. a mother or father may primarily listen to adult news and music content during their commute while alone in the car, but might listen to kids channels whenever their children are in the car).

Further still, the instant system and methodology allows for the measurement of data, audio, and video as well as other content delivered to a vehicle. For example, a vehicle can receive a display ad, coupon, cryptographic token, audio, video or other content relating to a fast food restaurant. Using data associated with what is being broadcast/transmitted to the vehicle as well as location data from the system, the instant method and system can determine whether the vehicle took an action, e.g. drove to the store or accessed a website, saved the information for later, etc. This analysis is also known as ad attribution. Comparing the activity of vehicles that viewed/heard an ad to the vehicles that did not view/hear the ad results in the ability to measure video store ad conversion rates, number of store visits, advertising lift and ad cost per store visit. Combining this data with consumer store spending data leads to a value per vehicle visit. Using GPS location data derived from the vehicle the system can develop driving patterns, store visit locations, and visited store types which comprise valuable intelligence for retailers. Such intelligence may include, for example, metrics describing the frequency, timing, number and type of visits/occurrences, repeating patterns, financial and other value exchange, redemptions, purchase analytics and the like. The impact may be measured using a variety of methods such as including both quantative and qualitative, as are typically employed in analysis of advertising, promotion and marketing campaigns, such as conversion factors, upsell analytics, engagement metrics (such as time in store) and the like which are well known in the art. Over time, visitation trends and macro and micro level events affecting real world behavior can be determined. Combining vehicle location data with consumer demographics, mobile devices and app usage delivers the most accurate ad targeting capability.

The foregoing attempts in the prior art fail to meet the needs of the industry, and the various stakeholders thereof. There exists significant industry demand, from the stakeholders identified above, for a more comprehensive in-vehicle media consumption measurement system that can provide greater accuracy, finer granularity and real-time measurement/analysis of media content consumption across all applicable sources—such a system does not exist today.

SUMMARY OF THE INVENTION

The present invention preserves the advantages of prior art monitoring, listening and reporting systems and methods for cross channel in car media, including audio, video, local and web-based applications and games, and other media types. In addition, it provides new advantages not found in currently available systems and methods and overcomes many disadvantages of such currently available systems and methods.

The invention is generally directed to the novel and unique system and method for cross channel in car media consumption measurement and analysis.

The invention meets the above-identified needs by providing a system, apparatus, method and computer software for obtaining, measuring and analyzing in real-time (or on such other basis that can be configured) all forms of media content that a driver or passenger may consume inside of an automobile. This includes, but is not limited to, AM/FM radio, Satellite Digital Audio Radio Service (SDARS), stored media such as CDs, MP3s, DVDs and MP4s, content streaming, internet radio, audio books, podcasts, text-to-speech content and other forms of content, including content routed to the In Vehicle Entertainment (IVE) system through integration with a smartphone, MP3 player, DVD/Blu-ray player, game console or other similar external Consumer Electronic (CE) device (via wired or wireless connectivity, including but not limited to USB, BLUETOOTH, Wi-Fi, etc.).

Of particular significance is the invention's ability to measure "cross channel" in-vehicle media consumption consistently and comparatively across multiple content types and sources (e.g. AM/FM radio, SDARS, internet radio, stored media, satellite video, terrestrial video, IP streaming video, ATSC 3.0 broadcasts, etc.).

Also of note is the invention's ability to provide not only better information on what content is being consumed, but incremental contextual information on how listeners respond to this content (such as changing station or skipping forward when they don't like what is playing, turning up the volume on favorite tracks, thumbs up, etc.). This incremental contextual information on how listeners respond to content for the first time provides the potential for a "feedback loop" to the creators/programmers of the applicable content (for example, allowing AM/FM radio stations to better understand how listeners respond to their broadcast, thus allowing them to enhance their programming to better meet their listener's preferences).

Another key factor is the invention's ability to measure in-vehicle media consumption using a much larger sample size than ever before contemplated due to the architectural approach that fully supports low-cost, large-scale deployment in millions of vehicles.

Also important is the invention's ability to provide real-time dynamic measurement of in-vehicle media consumption (compared to the extensive lag time between survey and report of the existing methodologies). Alternatively, the system can permit for real-time or periodic monitoring of the use of audio, video, display content and related data in a vehicle, via software installed in the head unit of a vehicle along with hardware to receive the data, audio and video signals/channels.

The measurement data and analysis from the invention may be provided to auto manufacturing companies, providers of media content (including those available currently and others that may be available in the future), advertising companies, platforms and agencies, the music industry and other interested parties.

The objective of the invention is to measure all applicable forms of media consumption in an automobile. This consumption will represent actual measured data rather than survey data (which is the only data available today).

Actual measurement and analysis of what media people consume while in a vehicle is important to multiple stakeholders, who are currently under-served by existing measurement services based on survey methodologies, including (but not limited to: 1) radio, television (and other content) advertising businesses to support the buying/selling and pricing of content advertising (the US market for radio advertising is valued at $17 billion in 2017 and television advertising revenue of $70 billion); 2) radio and television station owners and programming managers to guide their selection of programming and on-air talent; 3) the music industry and video production companies to gauge public reaction to artists and their work; 4) the automotive industry to understand the behavior of their customers; and 5) and any other entity that may be interested in the measurement and analysis of such media consumption.

The invention has been developed to provide a new level of in-vehicle media consumption measurement capability achieving the following objectives:

1. A substantially higher level of accuracy and granularity by using actual data measurement from a large sample population (rather than survey measurement from a small sample).
2. Provide an approach that makes large sample measurement viable by significantly reducing the per-vehicle installation and operational cost, and thus allowing widespread deployment in millions of vehicles
3. Provide the ability for real-time measurement and analysis, to meet the industry requirement for dynamic data.
4. Provide the ability to measure content from multiple sources in a consistent and comparable way (to include broadcast or internet services such as video sources, AM/FM radio and SDARS, personalized services such as PANDORA, IHEART RADIO, HULU, NETFLIX, etc., stored media content such as CD, MP3 and DVD/Blu-ray players and content sourced from a connected CE device (including various platforms for in-vehicle smartphone integration such as APPLE CARPLAY, GOOGLE ANDROID AUTO, HARMAN AHA RADIO, PANASONIC AUPEO, PIONEER ZYPR, FORD SYNC, MIRRORLINK, AIRBIQUITY CHOREO, HULU, VIMEO, YOUTUBE, COX, COMCAST, VERIZON, NETFLIX, HBO, AMAZON PRIME, etc.).
5. Provide more detailed metadata relating to what is actually consumed (such as song title, artist name, etc.). Such metadata may be achieved both through direct collection in the IVE and also through timestamp matching of the media source (e.g. a particular satellite radio channel) with a play list of the same content source captured separately.
6. Provide contextual data relating to the user's consumption behavior (such as turning up the volume during a favorite song, changing channel when the DJ is annoying, etc.)
7. Support analysis of different consumption habits in vehicles when used by different people (e.g. members of the same family) and in different situations (e.g. commuting alone vs. a weekend family road trip).
8. Allow determination of vehicle user demographics by merging and cross-referencing available, known data (such as vehicle VIN and vehicle owner information) with other sources of third-party data (such as cell phone UDID and user data) to provide more comprehensive analysis of vehicle usage and operator demographics.
9. Provide geographically referenced data to allow a more complete pattern of user behavior to be determined.
10. Provide listening and viewing habits in all makes and models of vehicles and in varying regions of the U.S.
11. Provide an industry-scale platform with capabilities for future expansion of additional capabilities, including but not limited to, such services as verification of audio and video ads (including the specific ID of such audio/video ad) actually played in vehicles, delivery of personalized audio/video ads into the vehicle, etc.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Referring to FIGS. 1-8 of the present invention, it is common today for content from many different sources to be consumed in a vehicle, and for these sources to utilize a multitude of technologies to deliver the content into the vehicle (e.g. AM/FM radio, SDARS, stored media players, cellular wireless, IP technologies, terrestrial and satellite video signals, ATSC 3.0, BLUETOOTH integration of CE devices, etc.). In order to effectively and comparatively measure actual media consumption from any and all of these sources, it is necessary to conduct measurement at a point in the system that has visibility of content played from any and all of these sources. The In Vehicle Entertainment (IVE) system, also known as the vehicle "head unit" is the only point at which content from each and every source can be measured—this is because the IVE controls all media playback in the vehicle through the built-in amplification, speaker systems and display screens.

IVE vehicle head units are very well known in the industry. They are, essentially, small computing devices of hardware that include storage (e.g. hard drive or solid state storage), a display, operation controls, a microprocessor, RAM, I/O inputs and outputs and an operating system installed and running thereon. The software of the present invention is installed on the head unit in similar fashion to how an application is installed on a desktop computer where the code of the software of the present invention resides in storage on the head unit and can be executed and run, when desired to interact with the head unit and components and devices connected thereto or residing therein. The construction and operation of such head units are so well known in the art that further details need not be provided herein.

Today's IVE systems, currently being designed and installed in vehicles, have sufficient computing hardware and software capability to allow various software modules to be run inside the IVE head unit itself, and the invention utilizes this to run a measurement and monitoring software module in the IVE head unit itself. This approach offers two key advantages over previous methodologies: 1) The software module can have visibility of the content meta-data (including on-screen meta-data such as artist name and song title, video title, etc.) for multiple sources either built-in or connected to the IVE head unit; 2) The software module can be built in to the IVE head unit by the vehicle manufacturer, thus providing a low-cost method to distribute the capability into a very large population of vehicles, and eliminating the significant cost of adding dedicated measurement devices to a vehicle post manufacture. These advantages are maintained where vehicles have IVE systems capable of supporting video, games and other applications as described herein.

Figure 1:
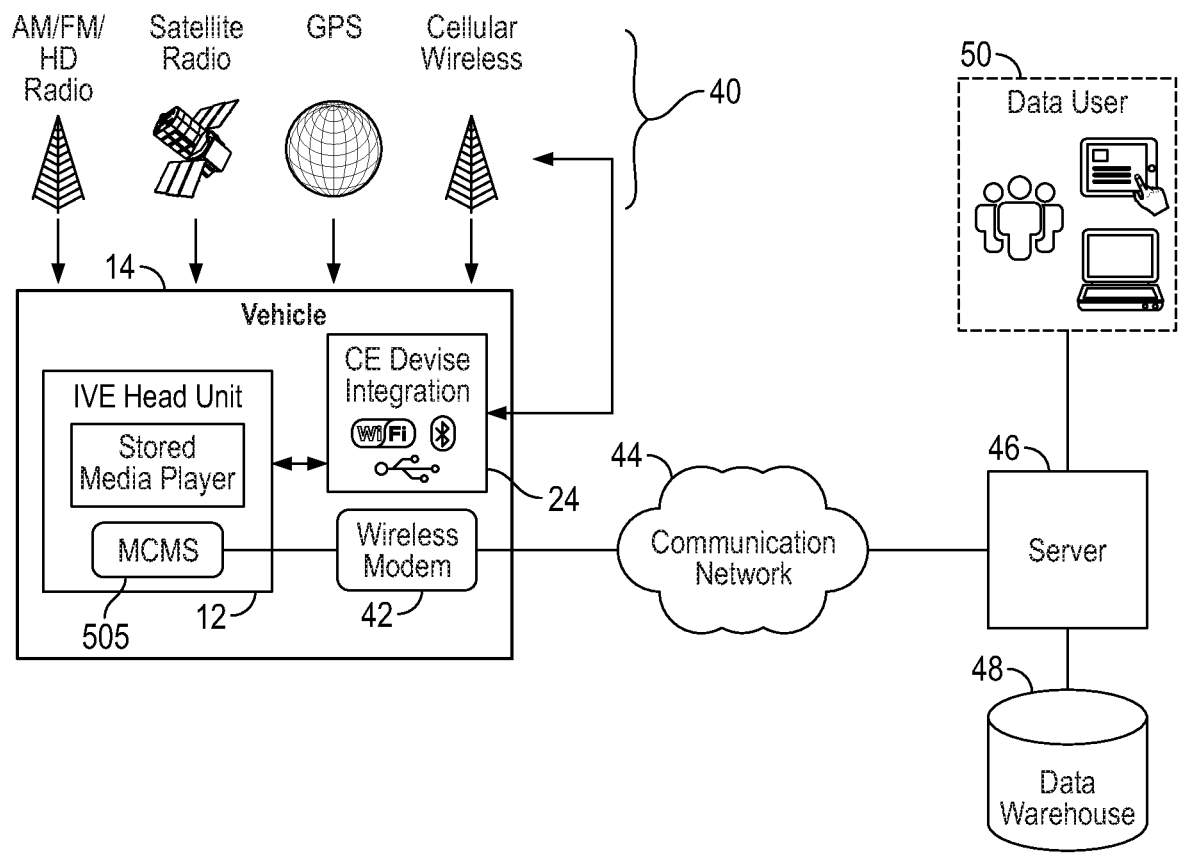
FIG. 1 is an overview of the system of the present invention.

Referring now to FIG. 1, an overview of the system and method of the present invention is shown. Through agreements with automobile manufacturing companies, and development with the automobile manufacturers and their IVE Head Unit "Tier 1" vendors, the Media Content Measurement Software (MCMS) of the present invention is embedded in the IVE Head Unit 12 (alternate embodiments could include the MCMS running in another suitable device in the vehicle 14). The MCMS will record, store, and transmit information relative to the media consumption of the vehicle occupants through the IVE System 12. This data will be sent back to a central repository (server 46, data warehouse or repository 48) via a wireless data network 44 (either integrated directly into the vehicle, or via a suitable connected device). For example, the present invention could use the cellular wireless network for this function through an embedded wireless modem in the car. Alternatively, any other connectivity system, wireless system or protocol could be used, such as Wi-Fi, DSRC, satellite, and the like. FIG. 1 shows an I/O port 24 for consumer electronic device integration, for receiving media sources such as internet radio, web-based audio content, terrestrial/satellite broadcast or IP based video sources, etc.

This data may include the following data parameters:

1. Vehicle Identification Parameters: A unique ID for the Data source (Vehicle), such as the VIN (Vehicle Identification Number) or alternate
2. Vehicle Position Parameters: GPS location data (lat/long) from the Vehicle's GPS (or equivalent) system
3. Vehicle Operation Parameters: Including start time, stop time, distance traveled, speed, acceleration/deceleration, etc.
4. Media Source Identification Parameters (e.g. FM radio, SDARS, CD/DVD player, integration with external CE device, etc.).
5. Listening Parameters: Timestamp data start of listening, end of listening, etc.
6. AM/FM Radio Parameters: tuned frequency, call letters derived from RDS (Radio Data System), signal strength for selected station, etc.
7. SDARS Parameters: channel identification, etc.
8. Connected CE Device Parameters (such as Smartphones, etc.): Service App identifier (e.g. PANDORA, IHEART RADIO, SLACKER, TUNE-IN, AHA RADIO, HULU, VIMEO, YOUTUBE, COX, COMCAST, VERIZON, NETFLIX, HBO, AMAZON PRIME etc.), wireless carrier identification, smartphone model identification, wireless signal strength, etc.
9. Smartphone Integration Parameters (such as relating to integration platforms such as APPLE CARPLAY, GOOGLE ANDROID AUTO, HARMAN AHA RADIO, PANASONIC AUPEO, PIONEER ZYPR, FORD SYNC, MIRRORLINK, AIRBIQUITY CHOREO, etc.)
10. Unique Identification Parameters for each connected CE device (such as Smartphones) to permit identification of multiple different devices used in the same vehicle (e.g. different smart phone used by family members)—this could be derived from CE device unique identifier, BLUETOOTH pairing identification, etc.
11. IVE System Operation Parameters relating to the use and operation of the IVE system by end users to provide analysis and feed-back to OEM car companies to facilitate IVE design improvements.
12. Vehicle Systems Parameters relating to the driver and passengers, including identification of which smart key used to operate the vehicle, drivers seat memory position selected, number of vehicle occupants (from seat belt sensors), etc.
13. Other Vehicle Systems Parameters for other vehicle systems identified as significantly interesting by partners such as OEM car companies and other stakeholders
14. Content Parameters (for all content sources): content metadata such as artist name, song title, album, episode, audio book name and chapter, commercial identifier for adverts, interstitial identifier for DJ talking, etc.
15. Contextual Data Parameters relating to the user's behavior while listening to the content, including but not limited to: a) using turning the volume up as a proxy for identifying content particularly liked by the used; and b) using the timing of when the user tunes away from the current source to another source to indicate content which is not liked.
16. Advertising Parameters relating to the delivery and consumption of adverts, whether general or personally targeted to allow validation of advert delivery and consumption.

Figure 2:
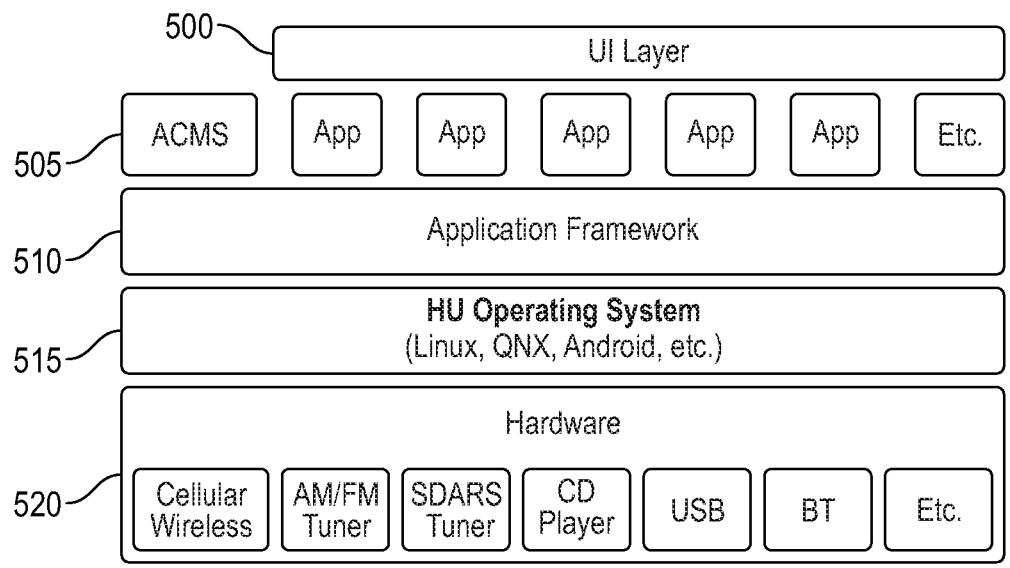
FIG. 2 shows details of the IVE head unit implementation of the MCMS of the present invention.

Turning now to FIG. 2, a more detailed diagram of the IVE Head Unit implementation of the MCMS is shown. The system architecture using a) the in-vehicle MCMS and b) the external server with connectivity between them provides maximum flexibility for optimal system management into the future. The system architecture includes a user interface 500, the MCMS software 505, an application framework 510, an operating system 515, and hardware components 520 such as a cellular wireless interface, an AM/FM tuner, a SDARS tuner, a CD player, a USB port, a BLUETOOTH transmitter/receiver.

For example, there would not be a requirement for a continuous data connectivity between server and MCMS because the data would preferably be cached by the MCMS and sent periodically in bursts when connectivity is available.

Also, the control of the individual MCMS in each vehicle is managed dynamically from the server throughout the life of the vehicle, allowing: 1) the amount of data reported out to the server by the MCMS to be dynamically controlled (thus allowing wireless data transport costs to be managed); 2) the time interval between reporting (e.g. every minute, every 5 minutes, etc.) to be dynamically controlled; 3) MCMS reporting to be individually stopped and/or started as required from each vehicle; and 4) the Data Parameters reported out by MCMS to be dynamically controlled (e.g. the ability to turn on or turn off the various data elements individually).

Figure 3:
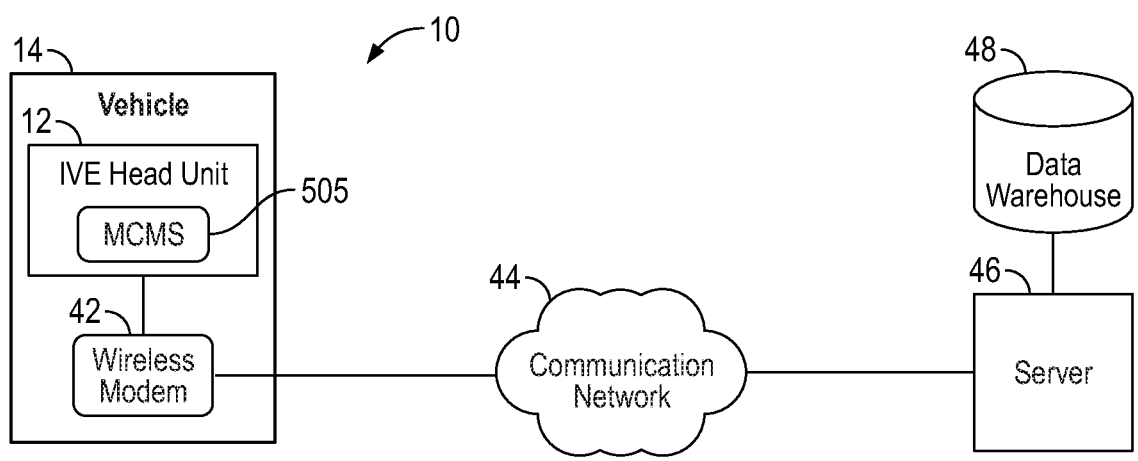
FIG. 3 is a flow chart showing the flow of data between an in-vehicle MCMS and an external server.

In FIG. 3, the data flow between the in-vehicle MCMS and the external Server is shown. This external server provides a number of important functions. First, it manages individual communication with multiplicity of individual in-vehicle MCMS modules (expected to scale to many millions). It also sends control commands to each MCMS providing dynamic management of each individual MCMS functionality (frequency of reporting, active parameters, etc.). The external server also receives and de-codes data sent from each MCMS. The data sent from each in-vehicle MCMS can be sent in periodic bursts (when connectivity is available). It builds a database using individual data records received from the multiplicity of MCMS modules, and stores this database in the Data Warehouse. The external server also processes the usage data to generate a variety of reports representing various aggregated usage behavior as required by stakeholders and also provides data warehousing and data mining operations.

The present invention includes a method and a system for measuring and analyzing in car media consumption through an in vehicle entertainment system 12 that is operable to selectively play media content, and that is operable to transmit data to a first server and a data warehouse.

Figure 4:
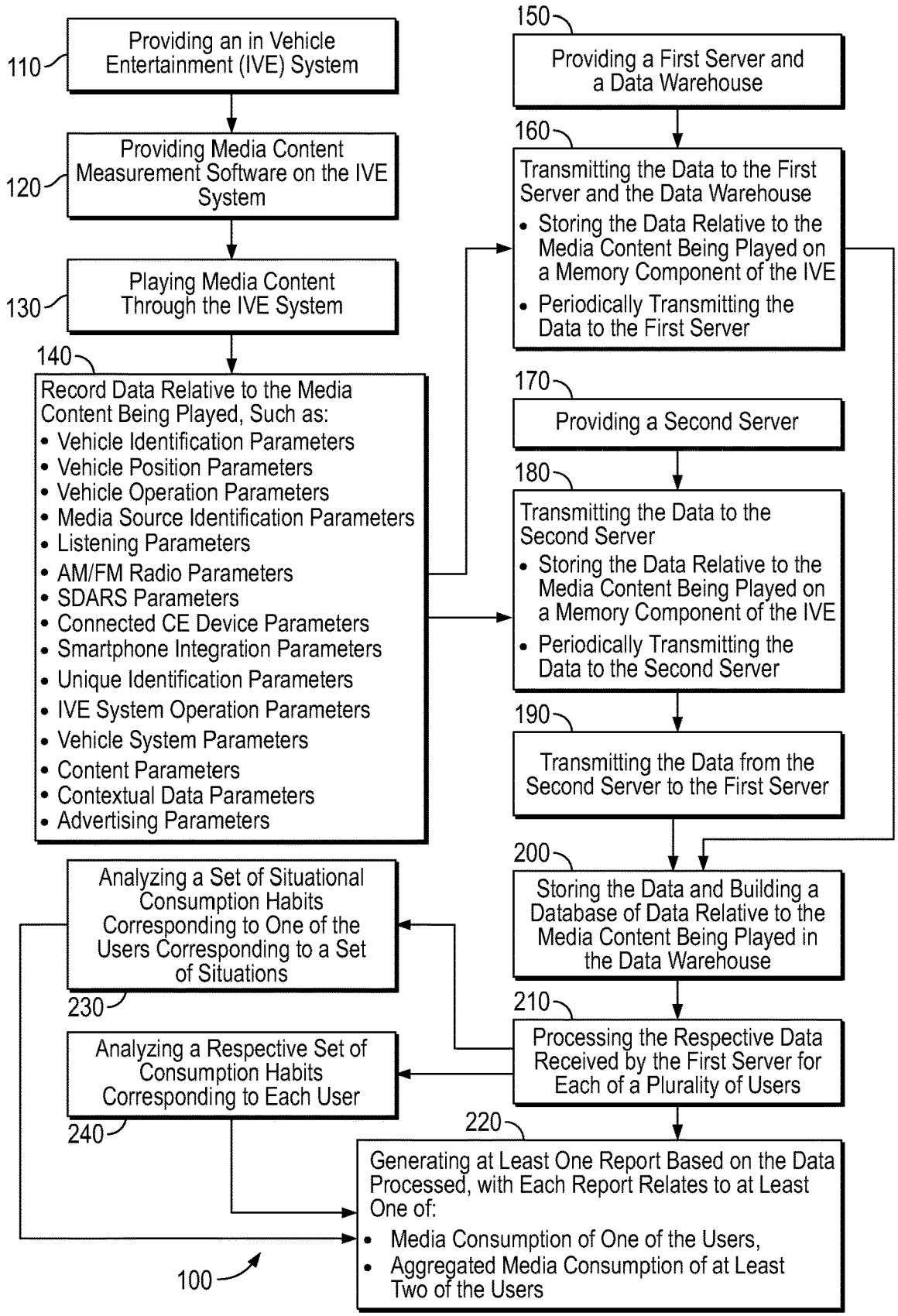
FIG. 4 is a flow chart showing an exemplary embodiment of the method of operation of the media content measurement system.

Turning to the exemplary embodiment of the method 100 of the present invention shown in FIG. 4, at step 110 an in vehicle entertainment system 12 is provided, either by a vehicle manufacturer or by a manufacturer of an in vehicle entertainment system for installation in a vehicle 14. Media content measurement software 505 is installed on the in vehicle entertainment system 12 at step 120. The operation of the media content measurement software 505 is discussed in more detail herein.

The user plays media content through the in vehicle entertainment system at step 130. Of note, the media content that is played through the in vehicle entertainment system can be any of the aforementioned media and application types including audio, video, video games, social media platforms, office productivity programs, and other applications.

At step 140, in real time, the content measurement software 505 records data relative to the media content that is being played by the in vehicle entertainment system 12. The data relative to the media content being played includes at least one of the following: vehicle identification parameters, vehicle position parameters, vehicle operation parameters, media source identification parameters, listening parameters, AM/FM radio parameters, SDARS parameters, connected consumer electronic device parameters, smartphone integration parameters, unique identification parameters, in vehicle entertainment system parameters, vehicle system parameters, content parameters, contextual data parameters, and advertising parameters. The parameters are outlined in more detail above.

At step 150, the method further includes the step of providing a first server 46 and a data warehouse 48 that is in communication with the first server 46.

The method then includes the step in which the MCMS includes instructions to transmit the data to the first server 46 through the communication network 44. The step of transmitting the data to the first server may be either through a direct connection or through an indirect connection through a second server, such as a vehicle manufacturer's server. In the direct connection, shown in step 160, the step of transmitting the data relative to the media content being played to the first server 46 and the data warehouse 48 may further include the steps of storing the data relative to the media content being played on a memory component 18 of the in vehicle entertainment system 12, and then periodically transmitting the data relative to the media content to the first server 46. Alternatively, a second server 52 is provided at step 170 for an indirect connection between the IVE 12 and the first sever 46 through the second server 52. In the indirect connection, the step of transmitting the data relative to the media content being played to a first server 46 and a data warehouse 48 may further include the steps of transmitting the data to the second server 52 (either at periodic intervals or in real time) at step 180, and transmitting the data from the second server to the first server at step 190.

Whether the direct connection of step 160 or the indirect connection of steps 180 and 190 is used, the data is then stored and a database of data relative to the media content being played is built in the data warehouse 48 in step 200.

The exemplary embodiment of the method also includes the step 210 of processing the data received by the first server 46 for each of a plurality of users. At step 220, then the method generates at least one report based on the data processed, with each report relating to media consumption of one of the users and/or aggregated media consumption of at least two users.

The step of processing the data received by the first server can include the steps of analyzing a respective set of listening habits corresponding to each user at step 230, and analyzing a set of situational listening habits corresponding to one of the users corresponding to a set of situations at step 240. The reports of step 220 can be generated based on the analysis steps 230, 240, or can be generated from raw data stored in the database.

Figure 5:
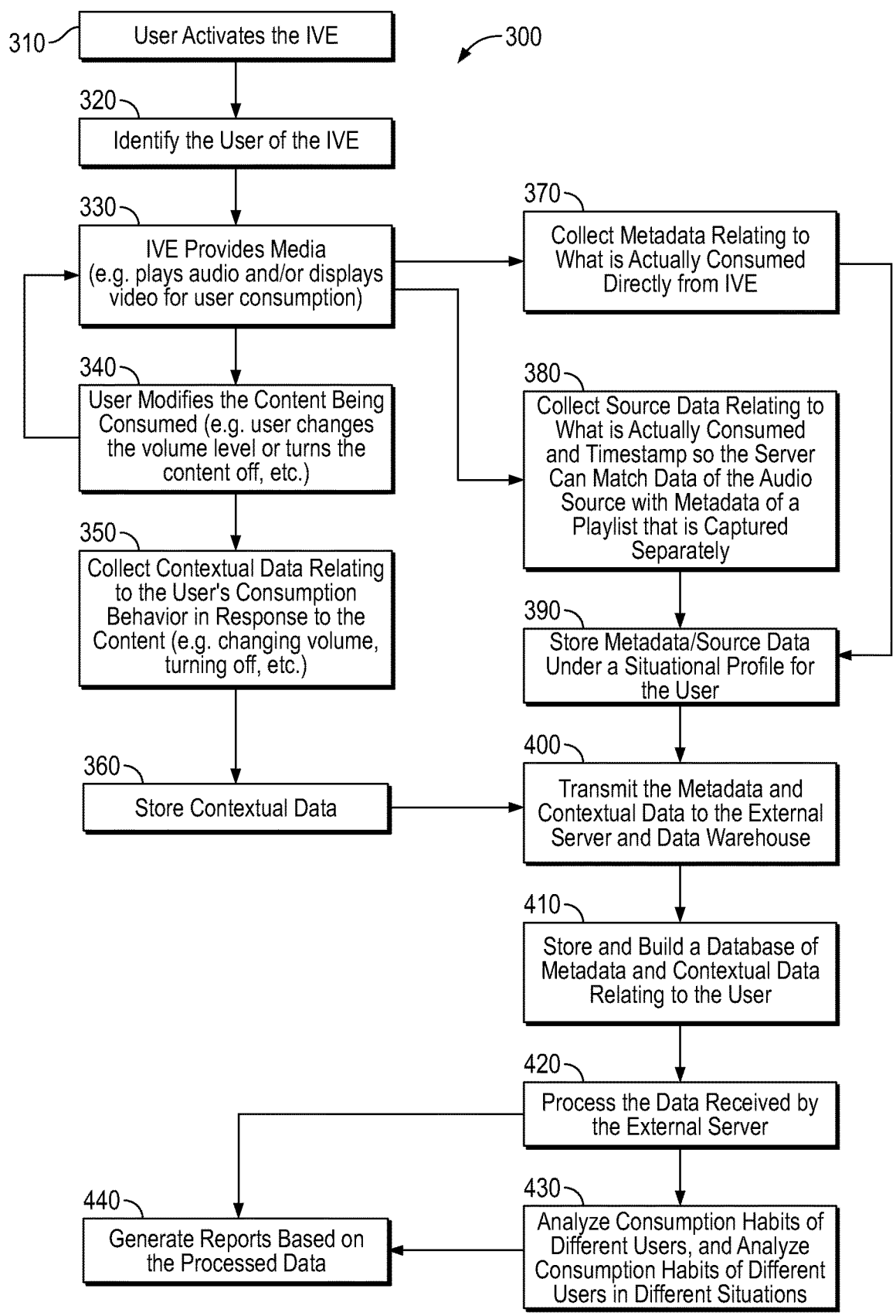
FIG. 5 is a flow chart showing an example of user interaction with the media content measurement system.

FIG. 5 shows an exemplary embodiment of a method 300 of how a user would interact with the IVE of the exemplary embodiment, with the MCMS operating to collect contextual data parameters and media metadata. In FIG. 5, a user activates the IVE 12 at step 310. The IVE 12 identifies the user at step 320, for example, by the user selecting a user profile in the IVE from a set of stored user profiles. Then at step 330 the IVE 12 either automatically plays media for the user, or plays media for the user in response to a command by the user. The IVE 12 is capable of playing audio and/or video for consumption by the user. In response to the media being played by the IVE, the user modifies the content being consumed at step 340. For example, the user can increase the volume when the user likes the media being played (e.g. a favorite song or video being played), decrease the volume when the user likes the media to a lesser extent, or the user can turn the media off when the user dislikes the media being played. The media content measurement software collects contextual data relating to the user's consumption behavior in response to the content being played at step 350. Thus, the media content measurement software collects data regarding for which content the user increased the volume, for which content the user decreased the volume, and for which content the user turned the media off or switched to another source. The media content measurement software stores this contextual data in the memory component (computer readable storage medium) 18 of the IVE at step 360.

Simultaneously with the contextual data collection, and simultaneously with the step 330 in which the media content is played by the IVE, the media content measurement software 505 is operable to collect metadata related to the content being consumed by the user, by at least one of two methods. First, at step 370 the software is operable to collect metadata related to the content being consumed when metadata is included in the media signal received by the IVE 12 or stored in the memory component 18 of the IVE 12. Second, at step 380 the software is operable to collect source data relating to the source of the content being consumed and the timestamp at which the content was consumed, so that the server can match metadata of the audio source with the audio source data.

After the software 505 of the IVE 12 collects the metadata and/or source data, it stores the metadata and/or source data in the memory component (computer readable storage medium) 18 of the IVE 12 at step 390.

Then at step 400 the software 505 instructs the processor to transmit the contextual data and the metadata and/or source data to the server 46 through the communication network 44 via the network interface 42. The server 46 stores this data and builds a database of the metadata and contextual data for each user at step 410. The server 46 includes server software that is operable to process the data received by the server and stored on the server, and the software processes the data received by the external server at step 420.

Through software supported on the server 46, the server 46 then analyzes the consumption habits of different users, and analyzes the consumption habits of different users in different situations. The server 46 then generates reports based on the processed data at step 440.

The present invention also provides a media consumption measurement system for measuring and analyzing in car media consumption. An exemplary embodiment of the media consumption and measurement system (MCMS) is shown at 10 in FIG. 6. The media consumption measurement system includes an in vehicle entertainment (IVE) system 12 that is mounted in a vehicle 14. Although shown installed in the vehicle, the IVE system 12 is provided either separately from a vehicle 14 or installed on a vehicle 14. The IVE system 12 is operable to selectively play media content, and that has a processor 16 and a memory component 18. Media content measurement software 505 is stored on the memory component 18 of the in vehicle entertainment system 10. The media content measurement software 505 is operable by the processor 16 and is configured to record data relative to the media content being played, in real time as the media content is being played.

Figure 6:
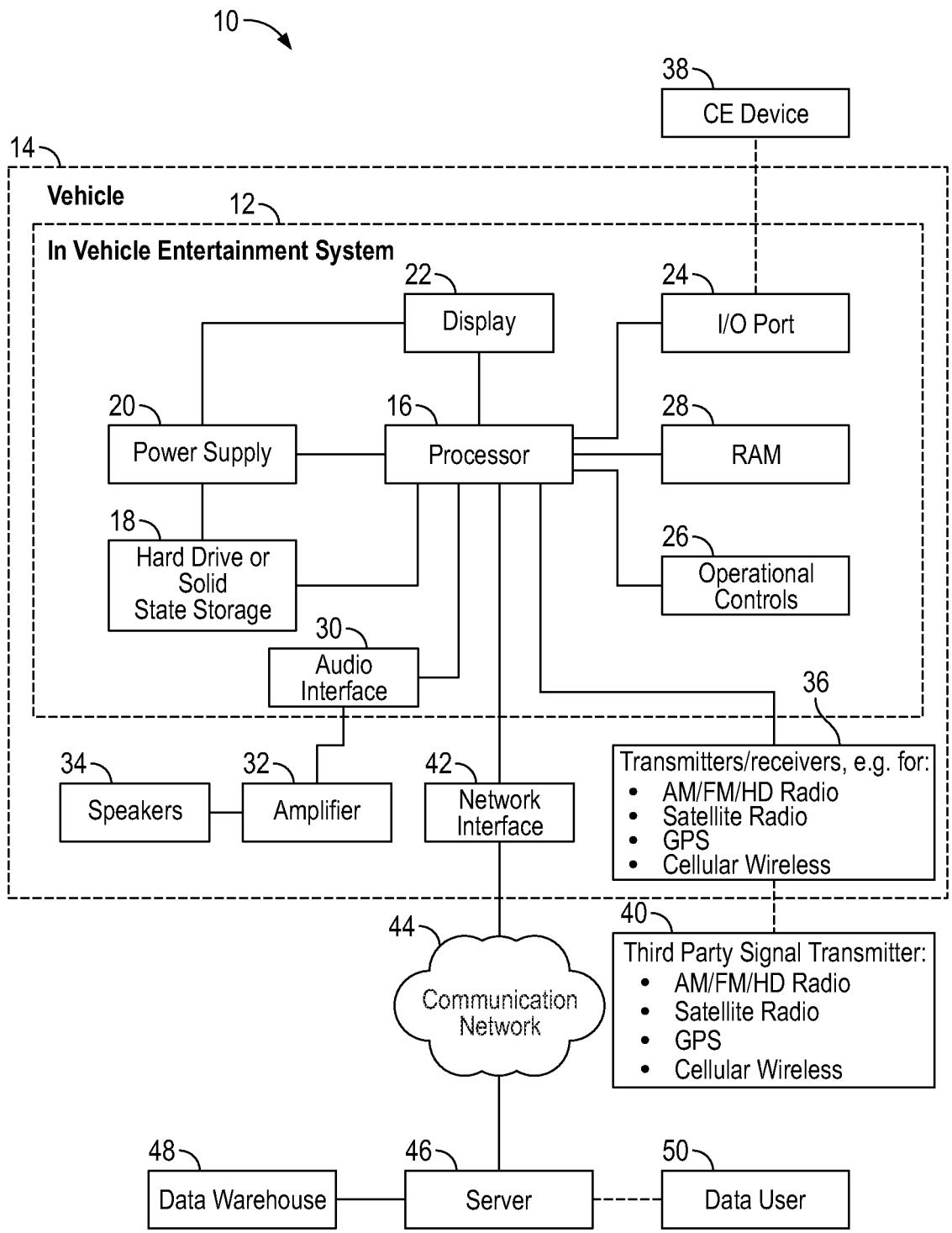
FIG. 6 is a block diagram of an exemplary embodiment of the media content measurement system.

FIG. 6 shows that the in vehicle entertainment system 12 includes a power supply 20 that is in electrical connection with a processor 16, a display 22, and a memory component (a computer readable storage medium such as a hard drive or a solid state drive) 18. The processor is in electrical connection with the display 22, the memory component 18, an input/output port (I/O port) 24, operational controls 26, and a random access memory (RAM) component 28. The processor is connected to an audio interface 30, such as an audio port that is capable of being connected to a sound system that is provided separately in the vehicle. The sound system of the vehicle typically includes an amplifier 32 and a set of speakers 34 that are connected. The amplifier 32 can be connected to the audio interface 30 of the IVE 12.

To receive media from an external source, the IVE 12 includes an I/O port 24 and the IVE 12 can be connected to transmitters/receivers 36 mounted in the vehicle. The I/O port 24 is useful for connecting the IVE 12 to a consumer electronic device (CE device) 38. The CE device 38 is an electronic device such as a smartphone, a laptop computer, a tablet computer, or another portable electronic device, and is generally provided separately by a user of the system. The processor 16 is also configured to be connected to transmitters and/or receivers 36 for receiving media from an external source. For example, the IVE 12 can be connected to an AM radio receiver, an FM radio receiver, an HD radio receiver, a satellite radio receiver, satellite video, terrestrial video, IP streaming video, ATSC 3.0 streams, a GPS receiver, a cellular wireless transmitter, a cellular wireless receiver, or any combination of these. Other transmitters and/or receivers that are useful for receiving media to be played on the IVE 12 can be included in other embodiments, whether now known or developed in the future. FIG. 6 shows that the transmitters/receivers 36 can be in communication with a third party signal transmitter 40, such as an AM/FM/HD radio transmitter, a satellite radio transmitter, satellite video, terrestrial video, IP streaming video, ATSC 3.0 streams, a GPS transmitter, a cellular wireless transmitter, or another signal transmitter.

The exemplary embodiment of the media consumption measurement system further includes at least one receiver 36 that is in communication with the in vehicle entertainment system 12. For example, the media consumption measurement system can include a receiver 36 configured to receive an AM radio signal and/or a receiver 36 configured to receive an FM radio signal and/or a receiver 36 configured to receive an HD radio signal and/or a receiver 36 configured to receive a satellite radio signal and/or a receiver 36 configured to receive a global positioning signal and/or a receiver 36 configured to receive a cellular wireless signal and/or a receiver configured to receive a video or computer based application. When media content is received by one of these receivers 36, the in vehicle entertainment system is operable to selectively play or run that media content.

FIG. 6 also shows that the processor 16 is connected to a network interface 42. The network interface 42 of the exemplary embodiment is shown as being an external component that is not part of the IVE 12, but that is connected to the IVE 12. Other embodiments not shown may incorporate the network interface into the IVE 12. The network interface 42 is useful for connecting the IVE 12 to a communication network 44. Through the communication network 44, the IVE 12 is able to communicate with the server 46, which is connected to the data warehouse 48, and which is operable by a data user 50. The communication network 44 may be a wireless network connection such as a wi-fi network, a cellular phone network, or another network.

The IVE 12 of the media consumption and measurement system 10 collects the data for users of that IVE, and the data for respective users of multiple IVEs across the system is then sent from the respective IVE 12 and directly or indirectly received by a first server 46 that is configured to receive the data. A data warehouse 48 is in communication with the first server 46, and is configured for storing the data and building a database of the data. The IVE system is configured to transmit the data to the first server.

Where the media consumption measurement system 10 relies on direct communication between the in vehicle entertainment system 12 and the first server 46, the first server 46 is configured to receive data transmitted from the in vehicle entertainment system 12, the first server 46 is configured to transmit the data to the data warehouse 48, and the data warehouse 48 is configured to receive the data from the first server 46.

Where the media consumption measurement system 10 relies on indirect communication between the in vehicle entertainment system 12 and the first server 46, a second server 52 is provided, and the second server 52 is in communication with the in vehicle entertainment system 12. The second server 52 is also in communication with the first server 46. Thus, the data can be transmitted from the in vehicle entertainment system 12 to the second server 52 and then to the first server 46.

Figure 7:
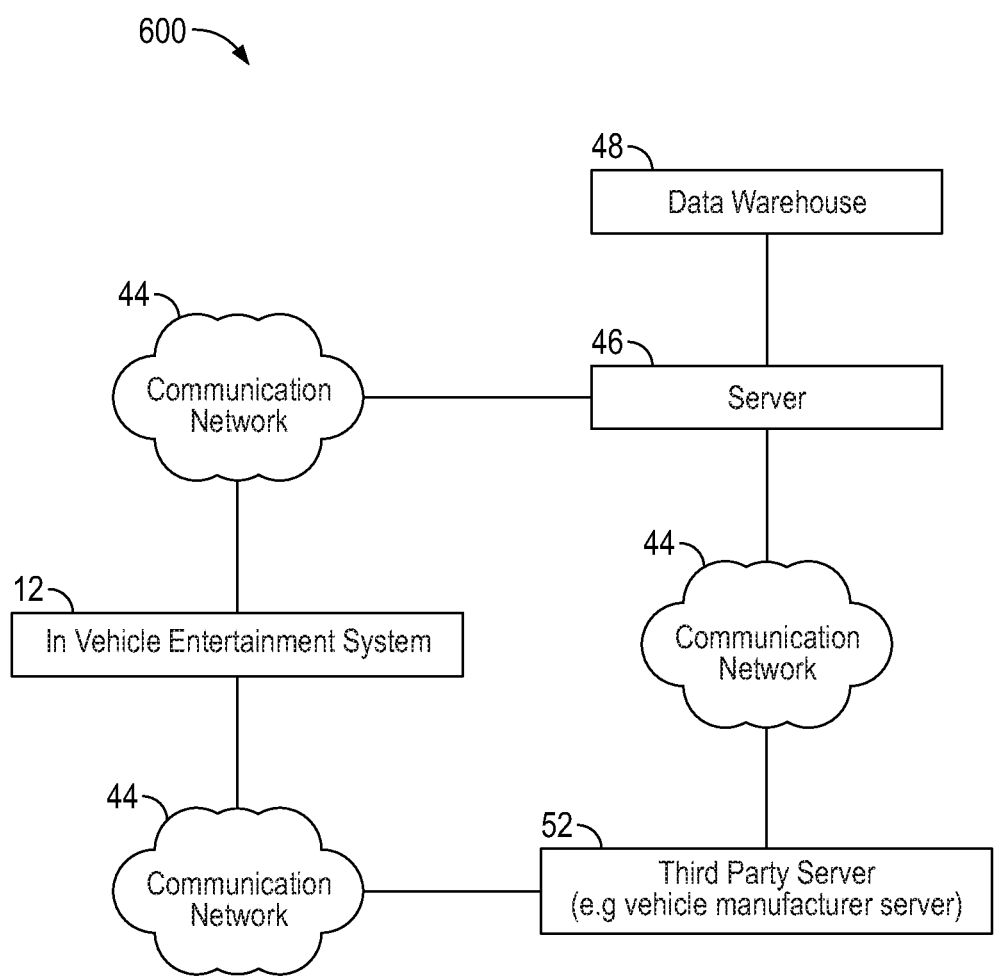
FIG. 7 is a block diagram showing communication between an IVE and a third party server.

FIG. 7 shows how an IVE 12 is configured to be in communication with the server 46 and data warehouse 48 as shown in FIG. 6, and the IVE 12 is configured to be in communication with a third party server 52, such as a vehicle manufacturer server. This third party server 52 is configured to be in communication with the server 12 of FIG. 6. This system 600 that relies on the third party server 52 is useful when the content measurement software on the in vehicle entertainment system 12 is part of the vehicle manufacturer's instrumentation software and media consumption data is obtained by the server through communication with the vehicle manufacturer's server 52. Although FIG. 7 shows three communication network cloud-shaped blocks each numbered 44, these communication networks may be the same network or may be different networks.

Figure 8:
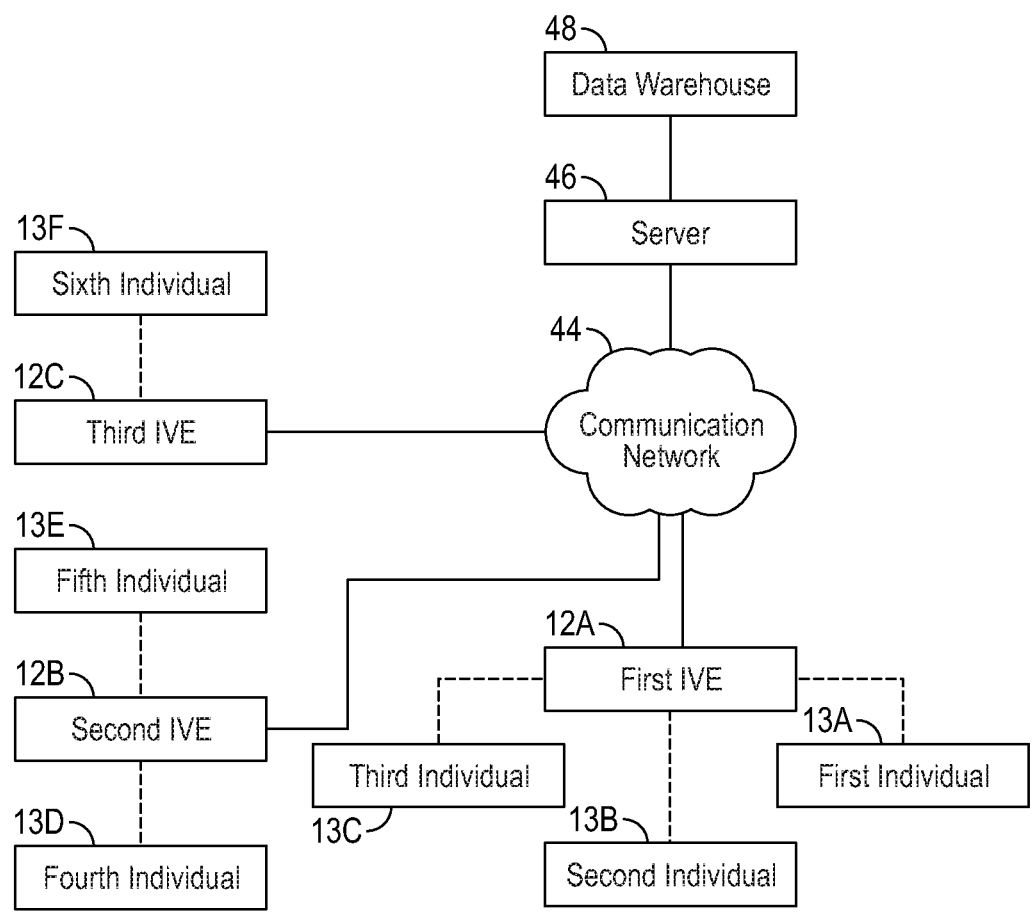
FIG. 8 is a block diagram showing a communication between three IVEs and a server.

FIG. 8 shows how the server of FIG. 6 interacts with a plurality of IVEs 12A, 12B, 12C in use. FIG. 8 shows a sample scenario in which a first IVE 12A is installed in a first vehicle (not shown) that is used by a first individual 13A, a second individual 13B, and a third individual 13C; a second IVE 12B is installed on a second vehicle (not shown) that is used by a fourth individual 13D and a fifth individual 13E; and a third IVE 12C is installed on a third vehicle (not shown) that is used by a sixth individual 13F. It is contemplated that as autonomous vehicles become more ubiquitous, the number of users that consume media, besides audio, in a given vehicle will necessarily increase as the driver will be able to consume more types of media including video and interactive applications. Each IVE 12A, 12B, 12C is configured as the IVE 12 of FIG. 6. Each IVE 12A, 12B, 12C is configured to be in communication with the server 46 through the communication network 44. The first IVE 12A collects information about the media consumption of the first individual 13A, the second individual 13B, and the third individual 13C, and the first IVE 12A then transmits that media consumption data to the server 46. Similarly, the second IVE 12B collects information about the media consumption of the fourth individual 13D and the fifth individual 13E, and transmits that information to the server 46. The third IVE 12C collects information about the media consumption habits of the sixth individual 13F and transmits that information to the server 46. The server 46 is configured to be in communication with additional IVEs (not shown), although only three IVEs are shown in FIG. 6 for simplicity of the example.

As noted above in relation to the method, the data relative to the media content being played by the IVE 12 of the system 10 includes at least one of the following: vehicle identification parameters, vehicle position parameters, vehicle operation parameters, media source identification parameters, listening parameters, AM/FM radio parameters, SDARS parameters, connected consumer electronic device parameters, smartphone integration parameters, unique identification parameters, in vehicle entertainment system parameters, vehicle system parameters, content parameters, contextual data parameters, and advertising parameters. The parameters are outlined in more detail above.

In the exemplary embodiment, the first server 46 is configured to process the data received by the first server 46, and the first server 46 is configured to generate reports based on the data processed. For this purpose, the first server 46 is provided as a general purpose server, such as a server that includes a server processor, a server memory storage device, a server power supply, and other components. Servers capable of supporting software and hardware for carrying out the steps performed by the server in the present invention are known the in art.

In addition or alternatively, the media consumption measurement system can allow for the measurement of data, audio and video as well as other content in a vehicle receiving such media content. For example, a vehicle can receive a display ad, barcode, cryprograhic token, coupon, audio, video or other content relating to a fast food restaurant. Using data associated with what is being broadcast as well as location data it can be determined whether the vehicle took an action, e.g. drove to the store or accessed a website, saved the information for later, etc. This analysis is also known as ad attribution. Comparing the activity of vehicles that viewed/heard an ad to the vehicles that did not view/hear the ad results in the ability to measure video store conversion rate, number of store visits, advertising lift and ad cost per store visit. Combining this data with consumer store spending data leads to a value per vehicle visit. Using GPS location data derived from the vehicle the system can develop driving patterns, store visit locations and visited store types which comprise valuable intelligence for retailers. Over time visitation trends and how macro and micro level events affect real world behavior can be derived. Combining vehicle location data with consumer demographics, mobile devices and app usage delivers the most accurate ad targeting capability.

The invention can additionally, or alternatively, report on the number video ads that are viewed in a vehicle ("exposures") or what percent of a video ad was viewed ("completion rate"). This data can be utilized to analyze why some ads have higher view rates. Different ads with similar advertising messages ("A/B testing") can be analyzed to calculate relevant content that should be delivered to each vehicle ("ad targeting"). Profiles and segmentation analysis for each vehicle can be determined. These may include but not be limited to business visitation, gender, age range, marital status, income, education, etc. Data derived from the invention can segment vehicles and their passengers to be deemed "Frequent Travelers, "Soccer Moms", "Luxury Shopper" and more.

Data surrounding the use of video game platforms and features can also be analyzed and reported on by the invention including but not limited to; game title, platform type, game publisher, category/genre, average session minutes, demographic composition (age/gender, income, education), and dayparts.

Data surrounding the use of social meda platforms and office productivity programs can also be analyzed and reported on by the invention including but not limited to: platform/porgam utlitized, category, average session minutes, demographic composition (age/gender, income, education), and dayparts.

The invention can also be used by auto manufacturer's and their supply chain partners for measuring and analyzing audio, video, gaming, app, and other content source access behavior of vehicle occupants to improve the customer experience, providing better personalization and understanding of the most important features and services needed in vehicles and for future autonomous vehicles. How vehicle occupants interact and access infotainment controls can be measured, analyzed and reported on.

A static or dynamic display ad can also be measured by the invention. This includes a vehicle passenger clicking on an ad to seek more information including directions to the store, online product information or to purchase the product or service. Passengers may also use the vehicle infotainment system to search for information using a web based browser (e.g., GOOGLE CHROME, MOZILLA FIREFOX, SAFARI). Information regarding web searches can be collected and analyzed by the invention.

The instant system can additionally, or alternatively, determine what applications and social media platforms (for example, INSTAGRAM, MICROSOFT EXCEL, MICROSOFT WORD, MICROSOFT POWERPOINT, LINKEDIN, FACEBOOK, TWITTER) are being accessed in a vehicle.

The invention can allow for a holistic comparison of audio, video, display data, applications and other content sources received in a vehicle delivered by IP, satellite, an ATSC 3.0 signal or other audio/video/display wireless distribution technologies for and their related technologies. Such cross media measurement is an important result of the invention.

It should be noted that the present invention is described and shown in connection with the monitoring and analysis of cross channel consumption in a vehicle but it should be understood the present invention has applicability in any environment or location.

It would be appreciated by those skilled in the art that various changes and modifications can be made to the illustrated embodiments without departing from the spirit of the present invention. All such modifications and changes are intended to be covered by the appended claims.

What is claimed is:

1. A method for measuring and analyzing in car video consumption through an in vehicle entertainment system located in a vehicle that is operable to selectively play video content, and that is operable to transmit data to a first server and a data repository, the method comprising steps of:
provoding the vehicle;
providing the in vehicle entertainment system as a head unit located in the vehicle;
providing a computing device in the head unit with storage, a display, operation controls, a microprocessor, a memory component, I/O inputs and outputs and an operating system installed and running thereon;

providing video content measurement software stored in the storage of the head unit as a module on the in vehicle entertainment system;

receiving the video content through the in vehicle entertainment system;

monitoring both the video content and user interaction with the in vehicle entertainment system, with the module on the computing device, as the video content is played by the in vehicle entertainment system;

the video content measurement software directly recording data relative to the video content being played, in real time, wherein the data includes content metadata of the video content being played;

providing the first server and the data repository;

transmitting the data relative to the video content being played to the first server and the data repository; and storing the data and building a database of the data relative to the video content being played in the data repository;

processing the data received by the first server for at least one user;

generating a report, based on the data, relating to consumption of video of the at least one user through the in vehicle entertainment system; the report relating to at least one of: video consumption of one of the users, and aggregated video consumption of at least two of the users; and determining a set of consumption habits of the at least one user from the report.

2. The method of claim 1, wherein the data relative to the video content being played comprises at least one of: vehicle identification parameters, vehicle position parameters, vehicle operation parameters, time parameters, media source identification parameters, consumption parameters, connected consumer electronic device parameters, smartphone integration parameters, unique identification parameters, in vehicle entertainment system parameters, vehicle system parameters, content parameters, contextual data parameters, and advertising parameters.

3. The method of claim 1, wherein the step of processing respective data received by the first server further comprises steps of:

analyzing the set of consumption habits corresponding to the at least one user;

analyzing a set of situational consumption habits corresponding to at least one user corresponding to a set of situations.

4. The method of claim 1, wherein the step of transmitting the data relative to the video content being played to the first server and the data repository further comprises steps of:

storing the data relative to the video content being played on a memory component of the in vehicle entertainment system; and periodically transmitting the data relative to the video content to the first server.

5. The method of claim 1, wherein the step of transmitting the data relative to the video content being played to the first server and the data repository further comprises:

providing a second server;

transmitting the data to the second server;

transmitting the data from the second server to the first server.

6. The method of claim 5, wherein time and frequency of the step of periodically transmitting the data relative to the video content to the first server is configurable.

7. The method of claim 1, wherein the video content is transmitted via one of ATSC 3.0, the internet, direct broadcast, and satellite.

8. The method of claim 1, wherein the video content is transmitted via a signal that includes a return data path.

9. The method of claim 1, wherein the video content includes one of an ad or a coupon which is targeted based on the report.

10. The method of claim 1, wherein the video content is one of an interactive video game, video programing, video calls, interactive applications, chat applications, and social media.

11. A video consumption measurement system for measuring and analyzing in car video consumption, the system comprising:

a vehicle;

an in vehicle entertainment system configured as a head unit in the vehicle, the head unit including a computing device with storage, a display, operation controls, a microprocessor, a memory component, I/O inputs and an operating system, the in vehicle entertainment system being operable to selectively receive video content;

video content measurement software stored on the memory component of the in vehicle entertainment system as a module, the video content measurement software being operable by the processor and being configured to directly record data relative to the video content being played, in real time, wherein the data includes content metadata of the video content being played, as the video content is played; the module being configured and arranged for monitoring the video content and user interaction with the in vehicle entertainment system, with the computing device, as the video content is played by the in vehicle entertainment system;

a first server configured to receive the data;

a data repository in communication with the first server, the data repository being configured for storing the data and building a database of the data;

wherein the in vehicle entertainment system is configured to transmit the data to the first server to generate a report, based on the data, relating to consumption of video of the at least one user through the in vehicle entertainment system; the report relating to at least one of: video consumption of one of the users, and aggregated video consumption of at least two of the users; and wherein a set of consumption habits of the at least one user is determined from the report.

12. The video consumption measurement system of claim 11, wherein the first server is configured to receive the data from the in vehicle entertainment system; and wherein the first server is configured to transmit said data to the data repository, and the data repository is configured to receive said data from the first server.

13. The video consumption measurement system of claim 11, further comprising:

a second server in communication with the in vehicle entertainment system, the second server being in communication with the first server, wherein the data can be transmitted from the in vehicle entertainment system to the second server and then to the first server.

14. The video consumption measurement system of claim 11, wherein the first server is configured to process the data received by the first server; and wherein the first server is configured to generate reports based on the data processed.

15. The video consumption measurement system of claim 11, wherein the data relative to the video content being played comprises at least one of: vehicle identification parameters, vehicle position parameters, vehicle operation parameters, time parameters, video source identification parameters, consumption parameters, video transmission parameters, connected consumer electronic device parameters, smartphone integration parameters, unique identification parameters, in vehicle entertainment system parameters, vehicle system parameters, content parameters, contextual data parameters, and advertising parameters.

16. The video consumption measurement system of claim 11, further comprising:
at least one receiver in communication with the in vehicle entertainment system, the at least one receiver being configured to receive at least one of: a video signal, an internet protocol signal, a global positioning signal, and a cellular wireless signal;
wherein the in vehicle entertainment system is operable to selectively play video content received by the at least one receiver.

17. The video consumption measurement system of claim 11, further comprising:
at least one input port configured to receive a signal from a peripheral device, the at least one input port being in communication with the in vehicle entertainment system;
wherein the in vehicle entertainment system is operable to selectively play video content received by the at least one input port.

18. The video consumption measurement system of claim 11, wherein the video content is transmitted via one of ATSC 3.0, the internet, direct broadcast, and satellite.

19. The video consumption measurement system of claim 11, wherein the video content is transmitted via a signal that includes a return data path.

20. The video consumption measurement system of claim 11, wherein the video content includes one of an ad or a coupon which is targeted based on the report, an interactive video game, video programming, video calls, interactive applications, chat applications, and social media.

* * * * *